United States Patent
Van Lunteren et al.

(10) Patent No.: US 12,175,377 B2
(45) Date of Patent: Dec. 24, 2024

(54) JOINT EXECUTION OF DECISION TREE NODES FOR ACCELERATING INFERENCES

(71) Applicant: International Business Machines Corporation, Armonk, NY (US)

(72) Inventors: Jan Van Lunteren, Rueschlikon (CH); Nikolas Ioannou, Zurich (CH); Nikolaos Papandreou, Thalwil (CH); Thomas Parnell, Zurich (CH); Andreea Anghel, Adliswil (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 17/127,104

(22) Filed: Dec. 18, 2020

(65) Prior Publication Data
US 2022/0198281 A1    Jun. 23, 2022

(51) Int. Cl.
| | |
|---|---|
| G06N 5/01 | (2023.01) |
| G06F 9/30 | (2018.01) |
| G06F 12/0811 | (2016.01) |
| G06F 16/901 | (2019.01) |
| G06F 16/903 | (2019.01) |
| G06N 5/04 | (2023.01) |

(52) U.S. Cl.
CPC .......... *G06N 5/01* (2023.01); *G06F 9/30036* (2013.01); *G06F 9/30038* (2023.08); *G06F 12/0811* (2013.01); *G06F 16/9024* (2019.01); *G06F 16/90339* (2019.01); *G06N 5/04* (2013.01)

(58) Field of Classification Search
None
See application file for complete search history.

(56) References Cited

U.S. PATENT DOCUMENTS

2013/0185239 A1    7/2013   Dedeoglu

FOREIGN PATENT DOCUMENTS

| CN | 107766883 A | 3/2018 |
|---|---|---|
| CN | 103902591 B | 4/2019 |

OTHER PUBLICATIONS

Browne et al., Forest Packing: Fast, Parallel Decision Forests, arXiv:1806.07300v1 [cs.PF] Jun. 19, 2018; Total p. 9 (Year: 2018).*

(Continued)

*Primary Examiner* — Alan Chen
(74) *Attorney, Agent, or Firm* — Eric W. Chesley (57) ABSTRACT

An approach of accelerating inferences based on decision trees based on accessing one or more decision trees, wherein each decision tree of the decision trees accessed comprises decision tree nodes, including nodes grouped into one or more supersets of nodes designed for joint execution. For each decision tree of the decision trees accessed, the nodes are executed to obtain an outcome for the one or more decision trees, respectively. For each superset of the one or more supersets of said each decision tree, the nodes of each superset are jointly executed by: loading attributes of the nodes of each superset in a respective cache line of the cache memory processing said attributes from the respective cache line until an inference result is returned based on the one or more outcomes.

19 Claims, 7 Drawing Sheets

(56) References Cited

OTHER PUBLICATIONS

Asadi et al., Runtime Optimizations for Tree-based Machine Learning Models, IEEE Transactions on Knowledge and Data Engineering, vol. 26, No. 9, Sep. 2014, pp. 2281-2292 (Year: 2014).*
"Accelerating Decision Tree-Based Predictive Analytics" Xelera, downloaded from the internet on Nov. 3, 2020, 10 pages, <https://xelera.io/blog/acceleration-of-decision-tree-ensembles#>.
Van Essen et al., "Accelerating a random forest classifier: multi-core, GP-GPU, or FPGA?", DOI: 10.1109/FCCM.2012.47, Conference Paper Apr. 2012, 9 pages, <https://www.researchgate.net/publication/261503251>.

\* cited by examiner

FIG. 5

JOINT EXECUTION OF DECISION TREE NODES FOR ACCELERATING INFERENCES

BACKGROUND

The invention relates in general to the field of computerized techniques for accelerating inferences based on decision trees. In particular, it is directed to computerized methods and computer program products relying on joint execution of decision tree nodes grouped into supersets of nodes.

Decision tree learning is a predictive modelling approach used in machine learning. It relies on one or more decision trees, forming the predictive model. Decision trees are widely used machine learning algorithms, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

Random forest and gradient boosting are important machine learning methods, which are based on binary decision trees. In such methods, multiple decision trees are "walked" in parallel until leaf nodes are reached. The results taken from the leaf nodes are then averaged (regression) or used in a majority vote (classification). Such computations can be time (and resources) consuming, hence a need to accelerating tree-based inference, notably for random forest and gradient boosting methods.

SUMMARY

According to a first aspect, the present invention is embodied as a method of accelerating inferences based on decision trees. The method comprises accessing one or more decision trees, wherein each decision tree of the decision trees accessed comprises decision tree nodes. Remarkably, these including nodes grouped into one or more supersets of nodes designed for joint execution. For each decision tree of the decision trees accessed, the nodes of said each decision tree are executed to obtain an outcome, whereby one or more outcomes are eventually obtained for the one or more decision trees, respectively. For each superset of the one or more supersets of said each decision tree, the nodes of said each superset are jointly executed by: loading attributes of each of the nodes of said each superset in a respective cache line of the cache memory, unless this respective cache line is already loaded in the cache memory; and processing said attributes from the respective cache line loaded. Finally, an inference result is returned based on the one or more outcomes obtained.

In embodiments, the nodes of said each superset are jointly executed by vector processing, whereby vector operations are speculatively performed on vector operands mapped onto the attributes of the nodes of said each superset as loaded in the respective cache line. Preferably, said each superset comprises k nodes of said decision tree nodes, whereby the respective cache line loaded in the cache memory comprises one or more sets of cached data, wherein each of the one or more sets of cached data includes at least k elements, onto which said vector operands are mapped.

According to another aspect, the invention is embodied as a computer program product for accelerating inferences based on decision trees. The computer program product comprises a computer readable storage medium having program instructions embodied therewith. The program instructions are executable by processing means, so as to cause the processing means to perform the steps of the above method.

Computerized systems and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 1A-1E illustrate how nodes of a decision tree can be grouped into supersets of parallel and sequential nodes for joint execution, as in embodiments.

FIGS. 2A-2C are diagrams illustrating how nodes of a decision tree can be grouped into supersets of hybrid nodes designed for joint execution, where such nodes are arranged in a partly-sequential, partly parallel manner, according to embodiments.

The accompanying drawings show simplified representations of devices or parts thereof, as involved in embodiments. In particular, the depicted trees and purposely small, for the sake of depiction. Similar or functionally similar elements in the figures have been allocated the same numeral references, unless otherwise indicated.

DETAILED DESCRIPTION OF EMBODIMENTS OF THE INVENTION

Figure 3:
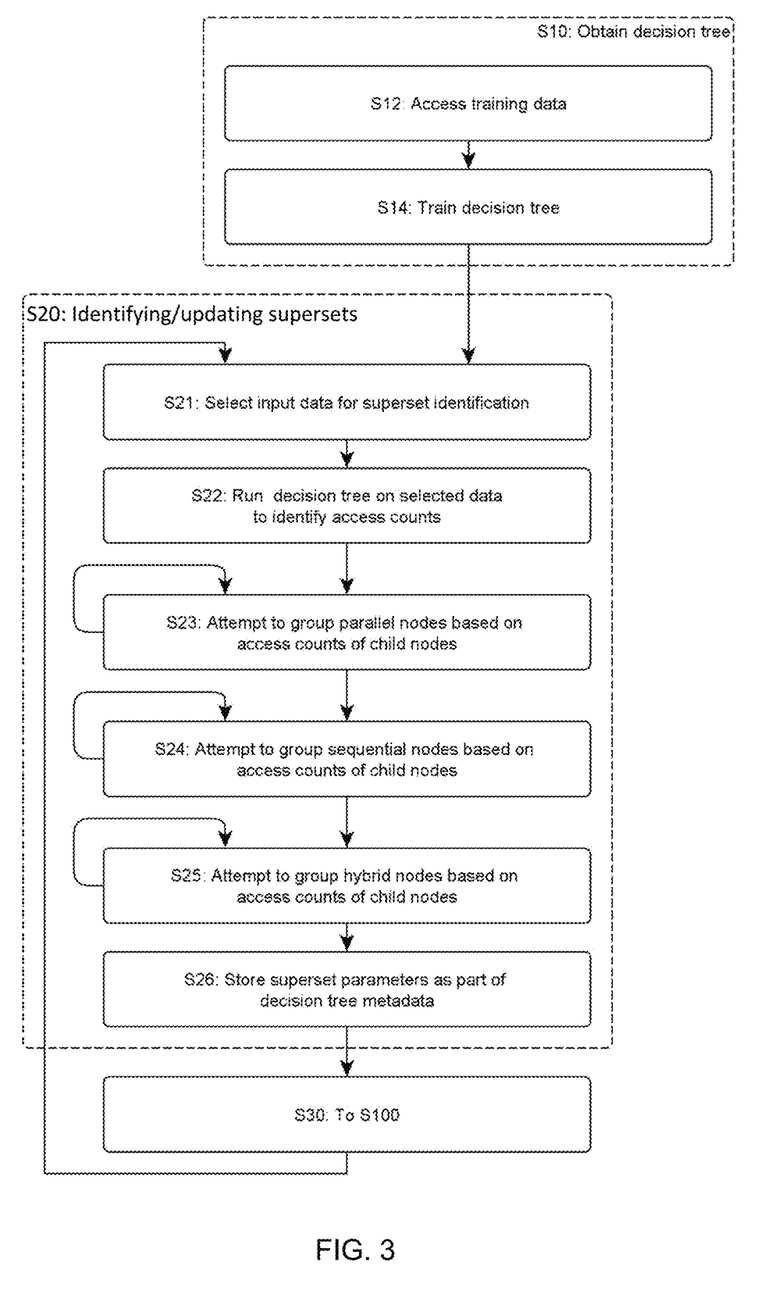
FIG. 3 is a flowchart illustrating high-level steps of a method for identifying supersets of parallel, sequential, and hybrid nodes, as groups of nodes for joint execution thereof, as in embodiments.
Figure 4:
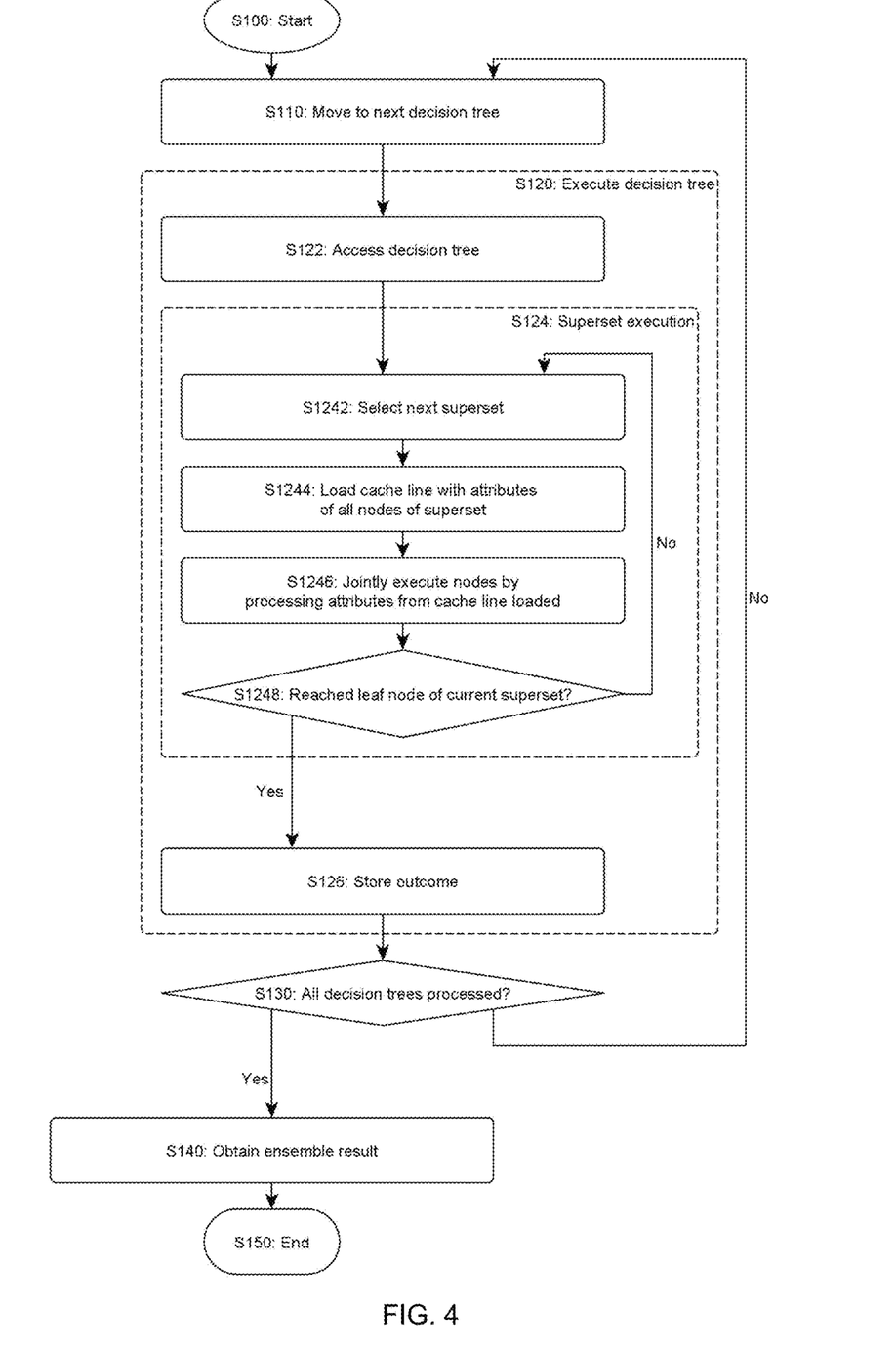
FIG. 4 is another flowchart illustrating high-level steps of a method of accelerating inferences performed based on decision trees, wherein the method leverages cache lines associated with supersets of nodes designed for joint execution, according to embodiments.

In reference to FIGS. 1, 2, and 4, an aspect of the invention is first described, which concerns a method of accelerating inferences based on decision trees. Note, this method and its variants are collectively referred to as the "present methods" in this document. All references Sij and Suk refer to methods steps of the flowcharts of FIGS. 3 and 4, while numeral references pertain to physical parts, components, or concepts (such as nodes, trees, and supersets) involved in embodiments of the present invention.

Figure 1A:
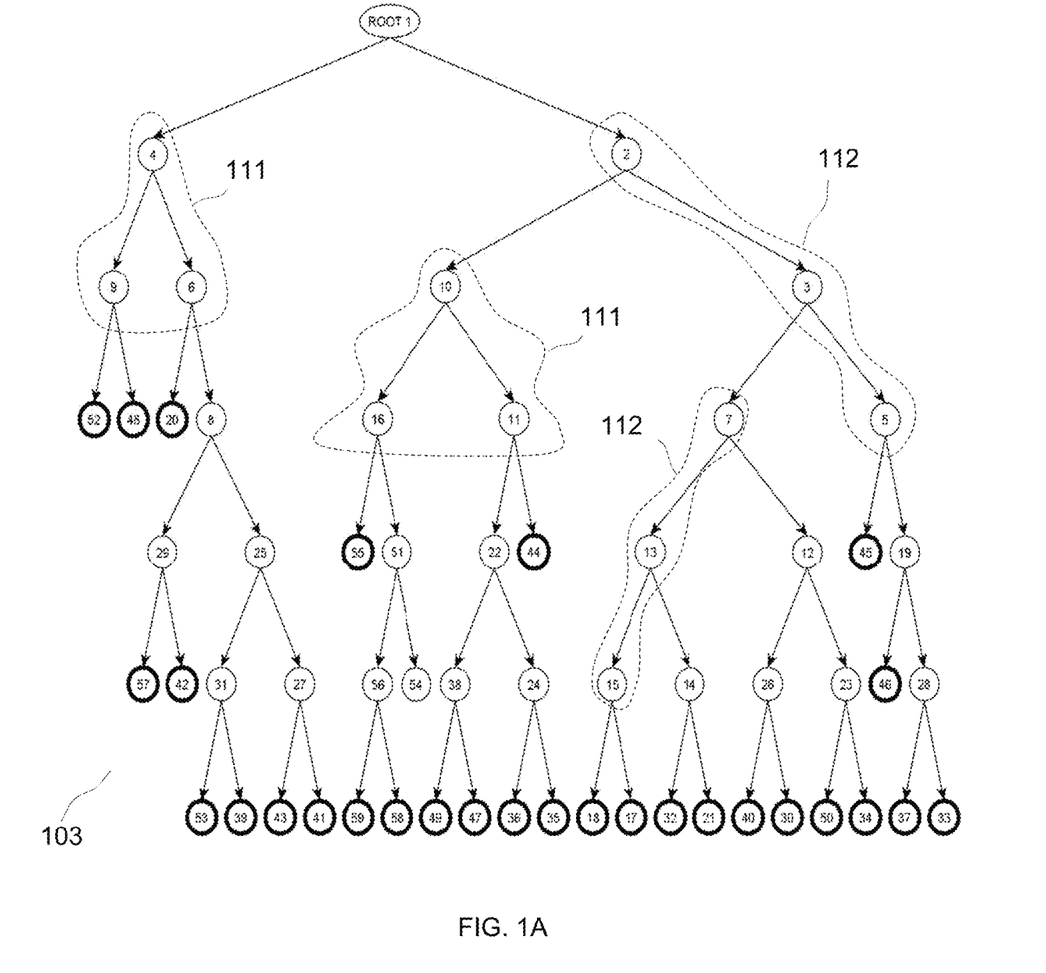
FIG. 1A shows an example of a decision tree, including both parallel and sequential node supersets.
Figure 2A:
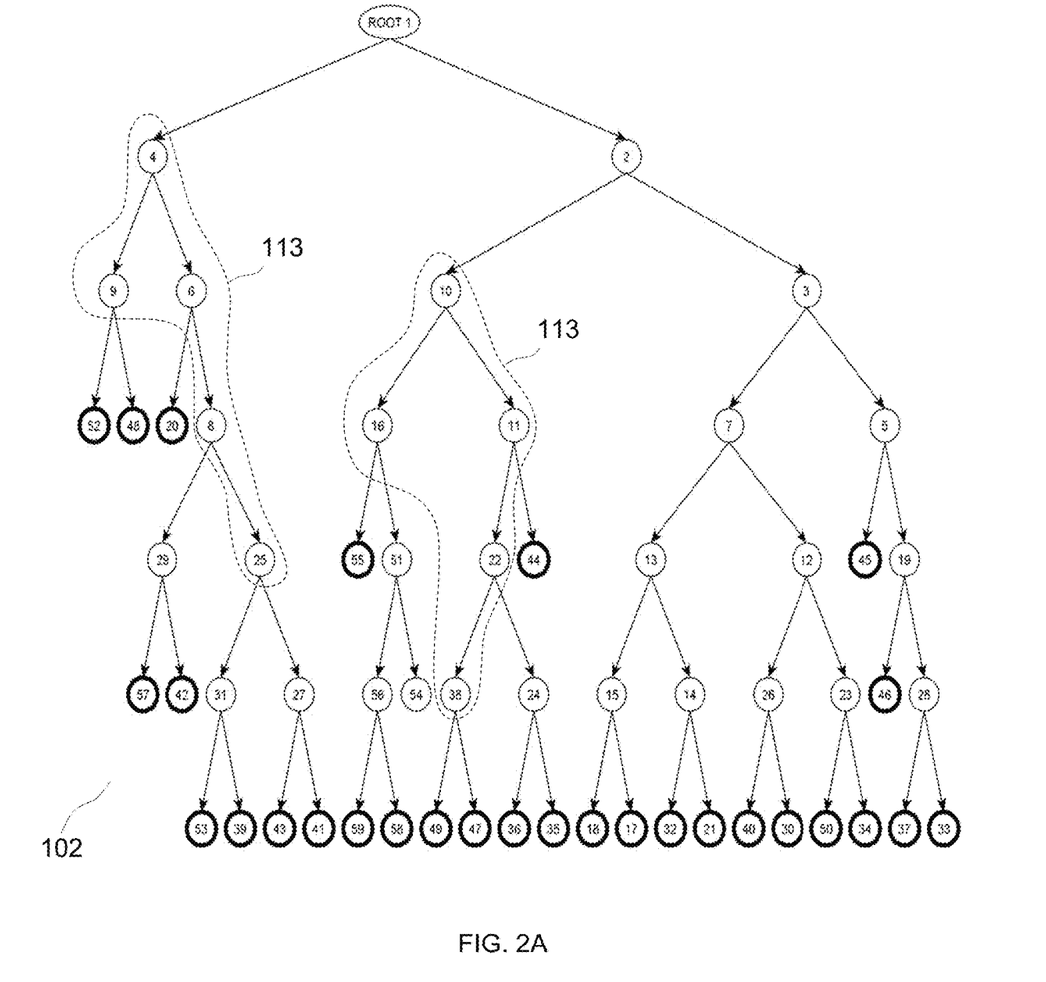
FIG. 2A shows an example of a decision tree that includes supersets of hybrid nodes.

The present method can access one or more decision trees, see step S122 of the flow of FIG. 4. As seen in FIGS. 1A and 2A, each decision tree 103, 102 of the decision trees accessed can comprise decision tree nodes 1-59. The nodes 1-59 of each of the decision trees 103, 102 accessed can be executed, step S120, so as to obtain S126 a given outcome for each of the decision trees 103, 102 accessed. Thus, one or more outcomes can eventually be obtained S140 for the one or more decision trees, respectively. Note, the following description mostly focusses on the execution of nodes of a single decision tree, for the sake of understanding. Yet, several trees may similarly be processed, as assumed in FIG. 4 (S130: No, S110).

According to the present invention, the nodes of at least one of the decision trees processed can include nodes that are grouped into one or more supersets 111, 112, 113 of nodes. That is, the nodes belonging to a same superset can be designed for joint execution.

Each decision tree accessed may accordingly comprise one or more supersets 111, 112, 113 of decision tree nodes, also referred to as nodes in this document, for simplicity. Consider a given decision tree, as processed at step S120. All the nodes of this decision tree as would normally be processed in the absence of the supersets are meant to be processed in the present case too. Yet, not all supersets and/or nodes may come to be processed, owing to the logic of the nodes. i.e., the algorithm can start at the root node (or the superset containing the original root node) and can continue until a leaf node is reached (whether in a superset or not).

Remarkably here, the nodes belonging to a superset can be jointly executed. More precisely, for each S1242 superset of the decision tree, the nodes of this superset can be jointly executed S1244-S1246 by exploiting attributes as stored in a cache line, as loaded in the cache memory for this superset. Namely, attributes of each of the nodes of each superset can be loaded S1244 in a respective cache line of the cache memory, unless this cache line is already loaded in the cache memory, while processing a current superset. Cache lines (also referred to as cache blocks) are known per se.

Figure 1B:
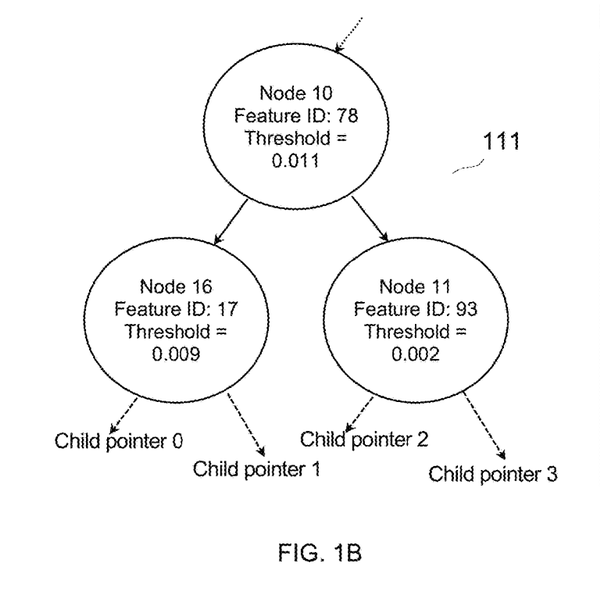
FIG. 1B focuses on a given superset of parallel nodes of FIG. 1A.
Figure 1D:
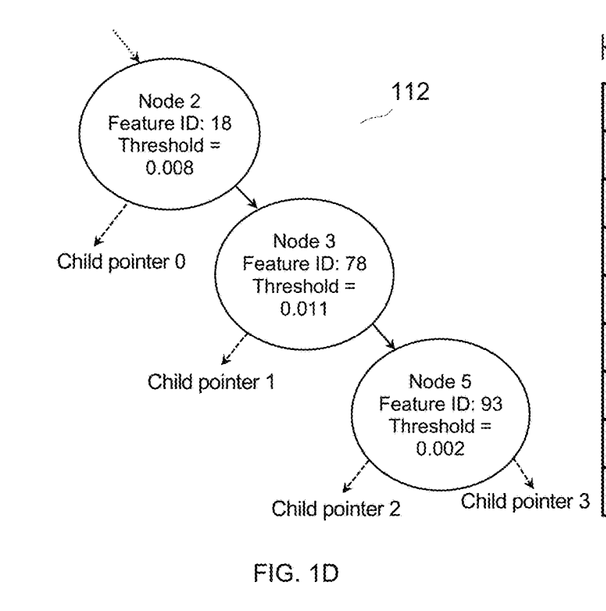
FIG. 1D depicts a given superset of sequential nodes of FIG. 1A.
Figure 2B:
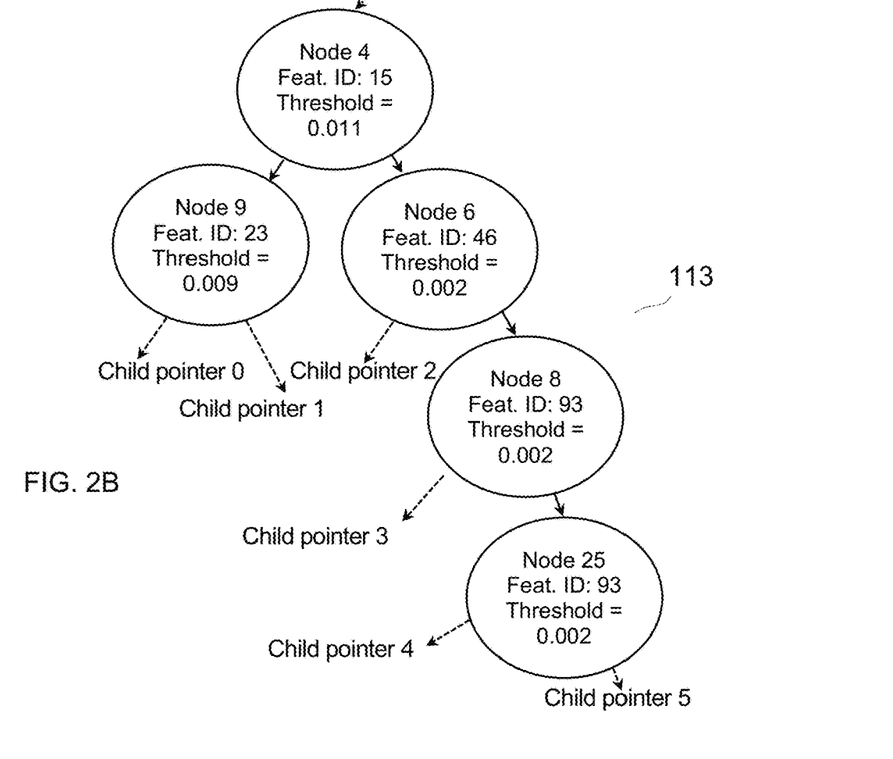
FIG. 2B focuses on a given superset of FIG. 2A.

That is, each superset can cause to load a respective cache line that can contain attributes of the nodes of this superset. Attributes of the nodes 1-59 may notably include operands required to execute such nodes. Such attributes may for instance include feature identifiers and thresholds used for comparisons (as assumed in FIGS. 1B, 1D, and 2B). More generally, such attributes may include arguments needed for evaluating the rules captured by the decision tree nodes. As seen in FIGS. 1B, 1D, and 2B, each node of a decision tree can typically be labelled with a node identifier, a feature identifier, and a threshold value, in view of performing an operation, whereby, e.g., a feature value corresponding to a feature identifier is compared to a threshold, as known per se. Note, the last remark can apply to intermediate, split, or non-leaf nodes (leaf nodes contain a leaf label).

Then, such attributes can be processed S1246 from the respective cache line loaded at S1244, for the purpose of executing S124 the nodes of this superset. The same process can be repeated S1248 for each superset of a current decision tree and for each decision tree.

Eventually, an inference result can be returned S140 based on the one or more outcomes obtained S126 for each of the decision trees considered (S130: No, S110) wherein processing ends S150. That is, several decision trees may come to be accessed; such decision trees may form part of an ensemble model, e.g., a random forest or a gradient boosting model, as known per se. Each binary decision tree is, nevertheless, processed independently, starting at the respective root node.

Accelerating tree-based inference for, e.g., random forest and gradient boosting, can basically be achieved by speeding up (i) the individual binary decision tree processing, and/or (ii) the parallel processing of multiple binary decision trees and the merging of the processing results. The above method focuses on the first aspect, although embodiments of the invention may also address the second aspect.

One element of the present approach can be to combine multiple, binary decision tree nodes into supersets of nodes (suitable for joint execution), whereby at least one of the decision trees processed comprises at least one superset of nodes allowing joint execution thereof. A superset can be regarded as a larger, combined node, and is sometimes referred to as a "compressed tree node" (or "compressed node") in embodiments, owing to data compression it allows in respect of attributes processed from the corresponding cache line.

According to the present invention, attributes of each of the nodes of each superset can be loaded in a corresponding cache line of the cache memory. That is, each superset can give rise to at least one cache line (or possibly more, as discussed below) being loaded in the cache memory, where each of such cache lines can include attributes of nodes of this superset. The same occurs for each superset of each decision tree 103, 102 processed. Nodes that are not mapped to any superset, if any, may still be processed as usual, and possibly using the same approach as described above (unmapped nodes may be processed as a special "superset", including a single node).

The selection of the binary decision tree nodes that form part of a superset may for instance be based on probabilities that the nodes are processed in parallel or one after the other for selected input data (step S21). That is, where clear paths or sequences of nodes can be identified, which are denser (or hotter) in terms of decision paths than the surrounding nodes, then binary decision tree nodes can be combined to form one or more supersets 111, 112, 113 of nodes.

It is notably possible to form parallel supersets 111 (FIG. 1A), sequential supersets (FIG. 1A), and hybrid node supersets (FIG. 2A).

Figure 1C:
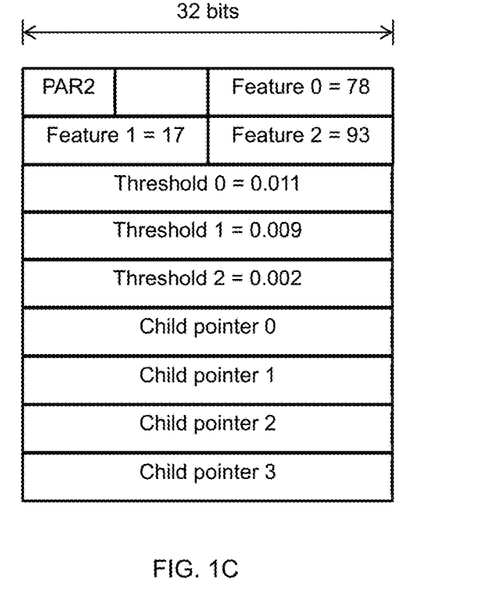
FIG. 1C shows how attributes of the nodes of this superset can be arranged in (part of a) a corresponding cache line, as loaded in the cache memory for a joint execution of the nodes of this superset. Similarly.
Figure 1E:
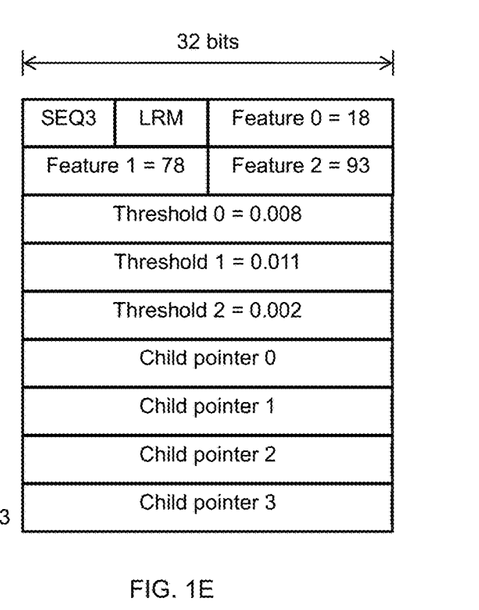
FIG. 1E illustrates how attributes of the corresponding nodes can be arranged in (part of a) a corresponding cache line for joint execution of the nodes.
Figure 2C:
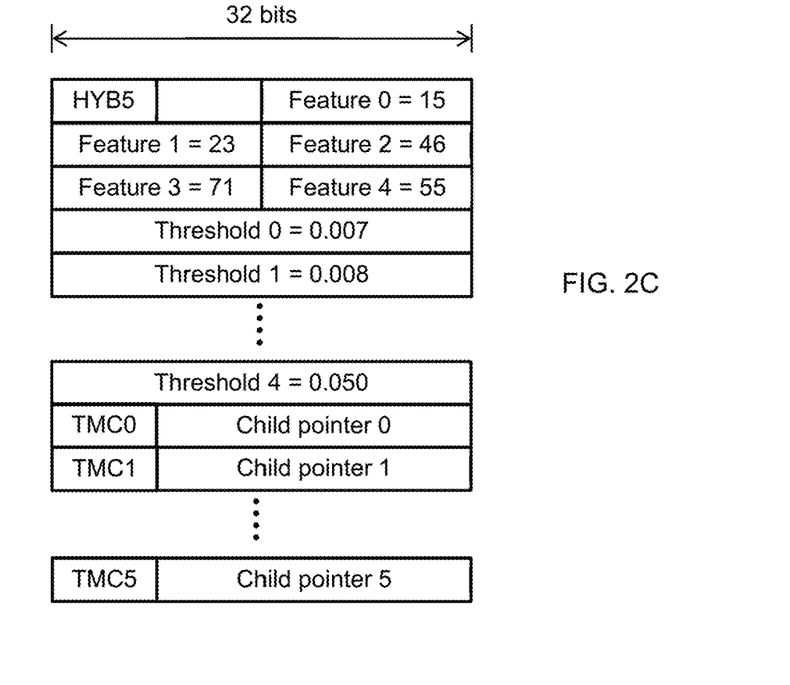
FIG. 2C shows how attributes of such hybrid nodes can be arranged in a corresponding cache line for joint execution thereof.

Namely, at least one of the decision trees accessed may comprise nodes grouped into a superset 111 of parallel nodes, designed for joint execution, as illustrated in FIGS. 1A, 1B, and 1C. In addition, or in variants, at least one of the decision trees accessed may comprise nodes grouped into a superset 112 of sequential nodes, where such nodes are again designed for joint execution, as illustrated in FIGS. 1A, 1D, and 1E. In practice, both sequential and parallel nodes can be favorably executed on one or more central processing units (CPUs). In variants, or in addition, at least one of the decision trees accessed may further comprise nodes grouped into a superset 113 of hybrid nodes, i.e., nodes arranged in a partly sequential, partly parallel manner, yet allowing a joint execution thereof, as illustrated in FIGS. 2A, 2B, and 2C. Hybrid multiway nodes were found to be more suitable for execution on field-programmable gate arrays (FPGAs), due to the processing overhead involved.

Such supersets can, for instance, be determined using training data, e.g., by running the decision trees on the training data, after having obtained the decision trees. Interestingly, the resulting supersets may possibly be refined and therefore updated over time, this giving rise to a dynamic management of the supersets, as in embodiments described later in reference to FIG. 3.

The proposed approach has multiple advantages. For example, the approach can enable a very efficient encoding of the tree nodes belonging to a same superset, allowing the spatial locality of the required data (the node attributes) to be substantially increased. This, in turn, can result in higher cache performance and improved utilization of the memory bandwidth of the caches and the main memory. Basically, fewer memory accesses are needed to execute the decision tree nodes, compared with usual approaches.

For instance, embodiments may only require a single cache line to be loaded for a whole superset of nodes, where this cache line contains attributes (e.g., operands) relevant to the execution S1246 of the nodes of this superset. Thus, the necessary node attributes (as required for executing the nodes of that superset) may possibly be contained in a single cache line, as in embodiments. Whether this can be done depends on the types of decision tree nodes and the cache limitations. In variants, several cache lines may be necessary. That is, attributes pertaining to each superset may fill a few cache lines, e.g., 2 or 3 (but typically less than 10 or even 5 cache lines). Still, such cache lines may possibly be loaded as contiguous cache lines, to exploit spatial locality of the data. In such cases, all the attributes of the nodes of each superset, as necessary for jointly executing S1246 such nodes, can be encoded to fit into m cache lines of the cache memory, $1 \leq m \leq 5$. The nodes of each superset can thus be jointly executed S1244-S1246 by loading attributes of the nodes in m cache lines (unless said cache lines are already loaded for the corresponding superset) and processing such attributes from the m respective cache lines loaded S1244.

Advantageously, the proposed scheme can support speculative vector-processing for decision trees, as discussed below in reference to embodiments. As a result, multiple binary decision tree nodes can be processed in parallel, resulting in higher processing efficiency for a given memory access granularity (e.g., cache line). The proposed scheme can be further applicable to multiple inference platforms, including CPUs and FPGAs. Where the nodes are executed by a CPU, the present method can be implemented at any cache level. For implementations with FPGAs, cache lines (or memory blocks) can be fetched from main memory and fed to the internal memory of the FPGAs, which can be regarded as cache memory for the FPGAs.

Experiments performed by the present Inventors with actual datasets have shown that the proposed approach can result in substantial reductions of storage requirements, as well as substantial improvements of inference latency and throughput. In particular, embodiments can make it possible to reduce inference times by a factor of approximately 2 to 8, depending on data considered and the platforms used.

All this is now described in detail, in reference to particular embodiments of the invention. Accordingly, the present approach can allow the nodes of each superset to be jointly executed S1244-S1246 by vector processing. In this case, vector operations can be performed in parallel on vector operands that are mapped onto the attributes of the nodes of each superset, as loaded in a respective cache line. Performing such vector operations can be regarded as speculative execution because the actual operations that need to be performed correspond to the nodes comprising the path within the superset that is "walked" for the given input data, and which only becomes known after the vector operations have been completed.

For example, assume that a given superset comprises k decision tree nodes. In that case, a respective cache line (as loaded S1244 in the cache memory) may comprise one or more sets of cached data, wherein each set of cached data includes at least k elements. That is, each node of the superset can give rise to at least one element. Then, the vector operands can be mapped on said elements. The sets of cached data may notably be distributed (e.g., in a contiguous manner) along the memory cache lines, as assumed in FIGS. 1C, 1E, and 2C.

In particular, one set of cached data may include k vector elements corresponding to k threshold values of the k nodes, respectively. There can be k such threshold values, e.g., one for each node of each superset. The threshold values can be a comparand involved in a comparison performed as part of executing S1246, a respective one of the k nodes. That is, threshold values can be used to evaluate a rule captured by a respective decision tree node. Such threshold values are denoted by "Threshold 0", "Threshold 1", etc., in the elements of the cache line structures shown in FIGS. 1C, 1E, and 2C. Elements corresponding to threshold values can be arranged contiguously in the cache line (as assumed in FIGS. 1C, 1E, and 2C).

Another set of cached data may for instance include k vector elements corresponding to k feature identifiers of the k nodes (or feature selectors), respectively. It should be noted there are k such identifiers for the nodes of the superset. The feature identifiers can identify a feature value to be compared with a respective one of the k threshold values, as part of executing a respective one of the k nodes. Such identifiers are denoted by "Feature 0", "Feature 1", etc., in FIGS. 1C, 1E, and 2C. The feature identifiers can identify those particular features (e.g., certain array elements) taken into account to perform the node operations. Again, such elements may possibly be arranged contiguously in the cache line, as assumed in FIGS. 1C, 1E, and 2C.

A further set of cached data may for example include child node identifiers of the nodes involved in the superset, see the cached data elements "Child pointer 0", "Child pointer 1", etc., in FIGS. 1C, 1E, and 2C. Child node identifiers can point to child nodes of a subset of the k nodes, wherein said child nodes are not in the superset of interest. Note, however, that the number of child node identifiers can advantageously be reduced compared with the number of child node identifiers that would otherwise be needed for executing the same nodes in a classical manner (i.e., independently of any superset), which is why such supersets can be regarded as compressed nodes. The number of child node identifiers required normally depend on the type of superset, as discussed later.

For example, the parallel superset 111 shown in FIG. 1B can be efficiently processed by loading a single cache line (FIG. 1C), which notably includes three sets of cached data. Such sets correspond to Feature l, $0 \leq l \leq 2$, Threshold l, $0 \leq l \leq 2$, and Child pointer l, $0 \leq l \leq 3$. That is, each set includes either k or k+1 elements in this example and may thus efficiently be processed using vector processing. Similarly, the sequential superset 112 shown in FIG. 1D can be efficiently processed by loading a single cache line (FIG. 1E), which again includes three sets of cached data, corresponding to Feature l, $0 \leq l \leq 2$, Threshold l, $0 \leq l \leq 2$, and Child pointer l, $0 \leq l \leq 3$. Each set of cached data again includes either k or k+1 elements in this example and may thus efficiently be processed using vector processing. Each cache line may further include additional elements, as discussed below.

Note, in each of the examples of FIGS. 1 and 2, the child node pointers can correspond to outgoing edges, i.e., the lower edges for a parallel superset (compare FIGS. 1B and 1C) or the edges escaping the sequential flow of the sequential superset (compare FIGS. 1D and 1E). Accordingly, for parallel and sequential supersets, where the child pointers point to mere leaf nodes, such pointers may possibly be replaced by a label, assuming a 1-bit flag suffices to discriminate between non-leaf child nodes and leaf nodes.

As noted above, supersets may involve several arrays, storing feature selectors, thresholds, and child node pointers, reflected as elements of a correspondingly loaded cache line. In addition, cache lines may possibly include, e.g., the types of supersets, the predict results (not shown), left-right maps (or masks), and/or flags (e.g., is_leaf, etc., not shown), pertaining to the original binary decision tree nodes that are mapped onto that superset. In particular, each cache line may include information concerning the type (e.g., "PAR2", "SEQ3", or "HYB5") of the supersets, as seen in FIGS. 1C, 1E, and 2C. In the examples of FIGS. 1C, 1E, and 2C, information of the type of supersets denotes: a superset with two levels of parallel nodes ("PAR2", FIG. 1C), a superset of three sequential nodes ("SEQ3", FIG. 1E), and a superset of five hybrid nodes ("HYB5", FIG. 2C). Note, the type fields ("PAR2", "SEQ3", and "HYB5") indicate not only the type of superset (parallel, sequential, or hybrid) but also the size of superset, e.g., the number of levels in a parallel superset, the number of nodes in a sequential superset, and the number of nodes in a hybrid superset.

The cache lines may further include additional information, e.g., the left-right map (also called left-right mask) or ternary-match conditions, to define how to reach the child pointers. For example, "LRM" in FIG. 1E denotes a left-right map, which is equal to 11 in this example. In FIG. 2C, "TMC" represents a ternary-match condition, where TMC0=00xxx, TMC1=01xxx, TMC2=1x0xx, TMC3=1x10x, TMC4=1x110, and TMC5=1x111 in this example. Note that ternary-match conditions are specified using 2-bit vectors defining a value and a mask.

Such embodiments can achieve very efficient compression and processing; the embodiments, in one aspect, differ from the usual processing of binary trees in that spatial locality of the required data (the attributes) is optimized. In addition: No explicit child node pointers need necessarily be stored for internal binary nodes within a given superset. The internal interconnection may be implemented using a fixed array indexing scheme, both for parallel and sequential nodes; The child node pointers stored in a given cache line only refer to child nodes of the corresponding superset, i.e., nodes pointed at by outgoing edges; and For sequential compressed nodes, further information may be included in the cache line, which relates to the path formed by the internal binary nodes, i.e., for each node it is indicated if it was originally a "left" or "right" child node. This determines how the internal node sequence can be processed; the threshold has to be either larger or smaller than the data for the selected feature in the internal nodes.

Further implementations and optimizations can be contemplated. For example, flags such as is_leaf (indicating if an internal node within a superset is a regular node or a leaf node), left right, etc., can be encoded at most significant bit msb positions of the feature array. The threshold/feature array may further store the results associated to internal leaf nodes of the supersets because the latter type of nodes do not need to store threshold and feature identifiers. And, as evoked earlier, leaf nodes can be migrated into the child node pointer fields of the parent node, another flag is used to discriminate between a real child node pointer and a migrated result. In addition, variable-sized feature selectors can be implemented. E.g., 1 Byte to select up to 256 features, 2 Bytes to select up to 64 K features, etc.

For hybrid supersets, the structure of the internal nodes in the superset can for example be defined as follows. As before, the corresponding feature values can be retrieved from the input row, based on the feature selectors in the nodes. It can further be assumed that the result of all the comparisons related to the internal nodes within a superset can be encoded as a vector of p bits, wherein p can be equal to the number of internal nodes and thus also equal to the total number of comparisons performed. In particular, the first bit can be set to 1 if the first comparison result implies that the feature value is larger than the threshold value; it can be set to 0 if the result implies it is smaller. Similarly, the second bit is 1 if the second comparison result implies that the second feature is larger than the threshold of the second internal node, and so on. Given that there are five internal nodes in FIG. 2B, this means that this result vector has 5 bits.

In addition, a ternary match vector defines how to reach each child pointer as shown in FIG. 2B. For example, in FIG. 2B child pointer 0 is to be reached if the first two comparisons (node 4 and node 9 in FIG. 2B) imply that the corresponding feature values are less than the corresponding threshold values. In that case, the 5-bit result vector is equal to 00xxx (x being unimportant). Such a ternary test vector 00xxx can advantageously be stored as part of the data structure of FIG. 2C, in relation to child pointer 0. Similarly, a test vector 01xxx corresponds to child pointer 1, a test vector 1x0xx corresponds to child pointer 2, a test vector 1x10x corresponds to child pointer 3, a test vector 1x110 corresponds to child pointer 4, and a test vector 1x111 corresponds to child pointer 5.

Note, a ternary test vector such as 1x110 can simply be stored as two binary vectors: 10110 and 10111. The first vector contains the actual relevant bit values, while the second vector is a mask defining which bit positions are relevant. Those masks can be added to a data structure such as shown in FIG. 2C, which can efficiently be processed using an FPGA (although it can also be done on a CPU). Interestingly, if a child pointer is replaced by a result leaf node (or label, as noted above), then the above approach can still operate in exactly the same way.

The following describes how nodes can be grouped in supersets, during a preliminary phase (i.e., prior to accessing S122 the one or more decision trees). As seen in the flow of FIG. 3, the one or more decision trees can be obtained S10 by learning S14 parameters thereof during a training phase, based on S12 training data. Then, based on S21, e.g., the training data, the learned decision trees can be run S22 to attempt S23-S25 to identify supersets 111, 112, 113 of nodes, i.e., groups of nodes that are suitable for joint execution in each decision tree and, this, for the decision trees 103, 102 involved. That is, the decision trees can be run S22 to identify the most likely data paths. Supersets 111, 112, 113 of nodes, accordingly, can be identified for each decision tree of interest. For example, superset parameters can be stored S26 as metadata of the corresponding trees.

As said, one may notably attempt to group nodes based on data path likelihoods. Several methods can be contemplated to estimate the latter. In practice, it was found most effective to first try identifying parallel nodes, for each decision tree of interest. Namely, steps S23-S25 may first comprise attempting S23 to group given nodes of each decision tree into a superset of parallel nodes. This can notably be achieved by comparing, for the nodes, access counts of two child nodes of a given node. If the access counts differ by less than a given predetermined bound, then this given node and its child nodes are grouped into a superset of parallel nodes, in view of jointly executing such nodes. Note, the above bound can be a threshold value (unrelated to threshold values involved when executing the nodes at run time), i.e., a comparand.

In more detail, for a current binary decision tree node (starting at the root note), the method may compare access counts of its two child nodes, and, if these are similar (i.e., the difference is less than a configurable bound), then a parallel superset (i.e., a compressed decision tree node) is created, and the current binary decision tree node and its two child nodes can be mapped onto the newly created superset. The method may then continue to map the child nodes of each of these two child nodes on the new superset, and so on (hence the self-loop at step S23). The process can repeat until: (i) a limit is reached for the maximum number of tree levels or nodes allowed, i.e., the maximum number of levels/nodes that can be mapped on a superset (e.g., given restrictions imposed by the cache lines), or (ii) the differences in access counts of the child nodes exceed said configurable bound.

The method may then attempt to identify sequential nodes. That is, steps S23-S25 may further comprise, after completing step S23, attempting S24 to identify a superset of sequential nodes, in view of jointly executing the sequential nodes so identified. This can be achieved by grouping nodes with one of the child nodes thereof having the largest access count, provided that these access counts differ by more than a given bound.

In more detail, if no parallel superset can be created for a current binary decision tree node (because the access counts of its child nodes differ by more than a configurable bound), then the method can attempt to create a sequential superset. There, the current binary decision tree node and the child node that has the largest access count can be mapped onto the newly created, sequential superset. The method can then continue trying to map a further child node (i.e., of the subsequent child nodes) that has the highest access count on this sequential superset, and so on. The process can repeat until at least (i) a limit is reached on the maximum sequence length allowed, (ii) a leaf node is reached, or (iii) the differences in access counts of the child nodes of the last mapped binary node are below a configurable bound.

Each of steps S23 and S24 can be repeated as necessary, starting from any unmapped node, i.e., a child node of the last binary tree node that was mapped onto a superset becomes the new current node and the process of S23 or S24 is repeated until all binary tree nodes have been mapped on a superset, if possible.

Further, hybrid nodes can be mapped in a similar way, while combining parallel and sequential supersets of nodes. In this case, there is no need to finalize a superset and switch to another node type (e.g., from parallel to sequential) where the access counts of the child nodes become substantially different.

Note, parallel and sequential supersets will typically have different sizes, based on their different types, which may require loading different numbers of cache lines. Preferably, though, attributes of nodes of each type of superset are designed to fit into a single cache line, as noted earlier and as assumed in the accompanying drawings. Note, for parallel and sequential supersets, data cache elements of variable sizes may be used to store the attributes, even if several cache lines are involved for each superset.

Accordingly, hybrid supersets can advantageously be executed on FPGAs, especially where attributes of each hybrid superset are constrained to fit in a same cache line size. A hybrid superset may for instance be obtained as follows. First, group nodes in a parallel manner and then in a sequential manner, just as explained above. Second, parallel and sequential supersets are combined to form hybrid supersets, to the extent permitted by the maximum memory size allowed for each cache line, or each block in this case. Such hybrid supersets can then favorably be executed on FPGAs.

Interestingly, supersets as initially identified S20 may be updated S20. This may for instance be achieved by running S22 the learned decision trees on additional data (e.g., test data), as selected at step S21. Accordingly, the method may attempt to identify updated supersets of nodes yet following same steps S23-S25 as described above (albeit for distinct data). Each decision tree may accordingly come to be updated S26.

Once supersets have been suitably identified S20 (or updated), e.g., once all nodes have been mapped onto a superset, the method may proceed S30 to step S100 (start of the flowchart of FIG. 4), for performing inferences based on the obtained/updated supersets of nodes.

Next, according to another aspect, the invention can be embodied as a computer program product for accelerating inferences based on decision trees. This computer program product comprises a computer readable storage medium having program instructions embodied therewith, wherein the program instructions are executable by processing means (CPU/GPU) 105 of given one or more computerized units 101, see FIG. 5, so as to cause such processing means to perform steps as described earlier in reference to the present methods. In particular, such instructions may cause a computerized unit to access one or more decision trees and execute the nodes of each decision tree to obtain one or more outcomes, whereby nodes of each superset are jointly executed, as described earlier. Joint executions may advantageously leverage vector processing, as discussed earlier too.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 5:
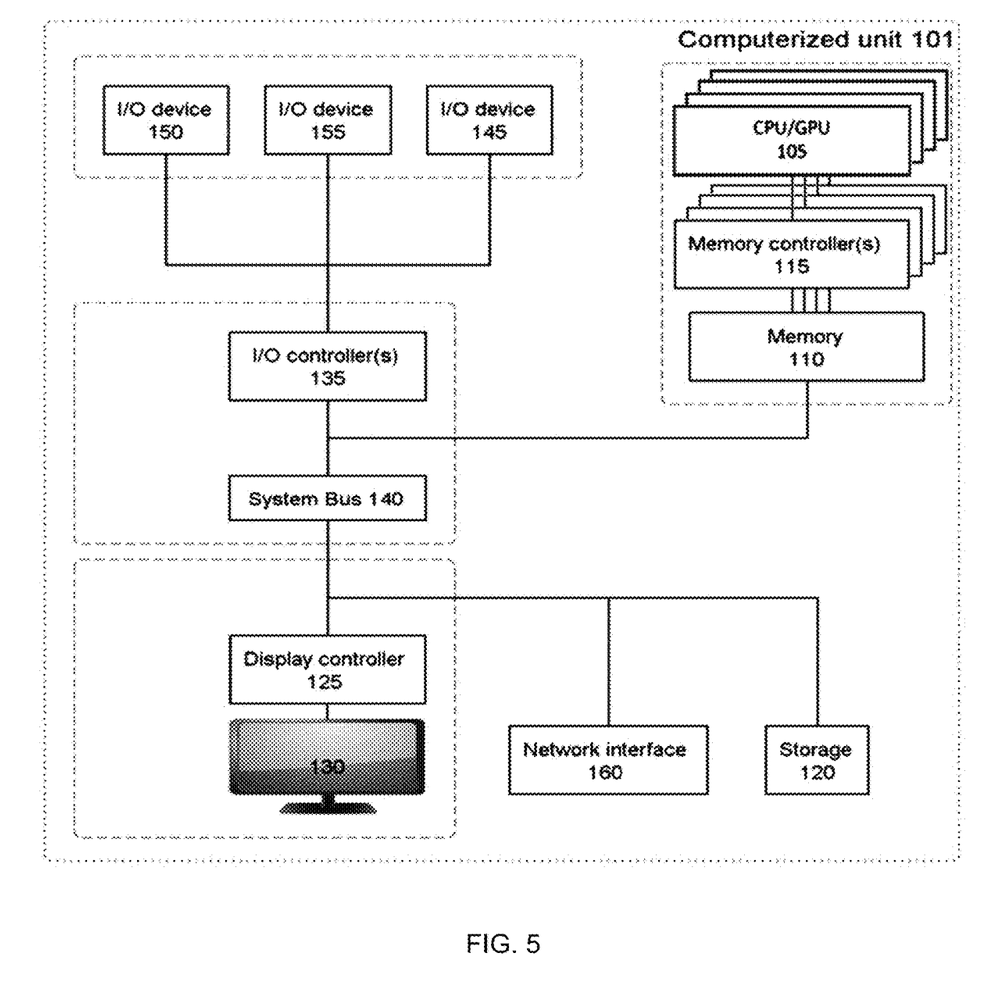
FIG. 5 schematically represents a general-purpose computerized system, suited for implementing one or more method steps as involved in embodiments of the invention.

For instance, FIG. 5 schematically represents a computerized unit 101 (e.g., a general- or specific-purpose computer), which may possibly interact with other, similar units, so as to be able to perform steps according to the present methods.

In exemplary embodiments, in terms of hardware architecture, as shown in FIG. 5, each computerized unit 101 includes at least one processor 105, and a memory 110 coupled to a memory controller 115. Several processors (CPUs, and/or GPUs) may possibly be involved in each computerized unit 101. To that aim, each CPU/GPU may be assigned a respective memory controller, as known per se. In variants, controllers of the computerized unit 101 may be coupled to FPGAs, for reasons mentioned earlier. I.e., some of the CPUs/GPUs shown in FIG. 5 may be replaced by FPGAs.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 5, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, input-output control, file and data management, memory management, and communication control and related services.

Possibly, a conventional keyboard and mouse can be coupled to the input/output controller 135. Other I/O devices 145-155 may be included. The computerized unit 101 can further include a display controller 125 coupled to a display 130. Any computerized unit 101 will typically include a network interface or transceiver 160 for coupling to a network or storage 120, to enable, in turn, data communication to/from other, external components, e.g., other computerized units 101 and archiving.

The network transmits and receives data between a given computerized unit 101 and other computerized units 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given computerized unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may thus be a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computations performed according to the present methods may possibly be provided as a cloud service. However, it is to be understood that implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of accelerating inferences based on decision trees, the method comprising:
accessing one or more decision trees, wherein each decision tree of the decision trees accessed comprises decision tree nodes, these including nodes grouped into one or more supersets of nodes designed for joint execution, wherein at least one of the decision trees that is accessed comprises nodes grouped into a superset of parallel nodes, arranged in a parallel manner in said at least one of the decision trees;
for each decision tree of the decision trees accessed, executing the nodes of said each decision tree to obtain an outcome, whereby one or more outcomes are obtained for the one or more decision trees, respectively, wherein:
for each superset of the one or more supersets of said each decision tree, the nodes of said each superset are jointly executed by:
loading attributes of each of the nodes of said each superset in a respective cache line of a cache memory, unless this respective cache line is already loaded in the cache memory; and
processing said attributes from the respective cache line loaded, and returning an inference result based on the one or more outcomes obtained.

2. The method according to claim 1, wherein:
said at least one of the decision trees accessed further comprises nodes grouped into a superset of sequential nodes, the latter arranged in a sequential manner in said at least one of the decision trees.

3. The method according to claim 2, wherein:
both the sequential nodes and the parallel nodes are executed on one or more central processing units.

4. The method according to claim 2, wherein:
said at least one of the decision trees accessed further comprises nodes grouped into a superset of hybrid nodes, the latter arranged in a partly sequential, partly parallel manner in said at least one of the decision trees.

5. The method according to claim 4, wherein:
at least the hybrid nodes are executed on one or more field-programmable gate arrays.

6. The method according to claim 1, wherein the method further comprises, prior to accessing the one or more decision trees:
learning the one or more decision trees based on training data; and
based on said training data, running the learned decision trees to attempt to identify, for said each decision tree, supersets of nodes as groups of nodes that are most likely to be jointly processed in said each decision tree, and accordingly identifying the one or more supersets of nodes for said each decision tree.

7. The method according to claim 6, wherein:
the method further comprises running the learned decision trees on additional data to attempt to identify, for said each decision tree, updated supersets of nodes as groups of nodes that are most likely to be jointly processed in said each decision tree, and accordingly updating said each decision tree by identifying one or more, updated supersets of nodes.

8. The method according to claim 6, wherein:
attempting to identify said supersets comprises attempting, for said each decision tree, to group given nodes of said each decision tree into a superset of parallel nodes by comparing, for each given node of said given nodes, access counts of two child nodes of said each given node, whereby if the access counts differ by less than a given bound, then said each given node and its child nodes are grouped into a superset of parallel nodes, in view of jointly executing the parallel nodes.

9. The method according to claim 8, attempting to identify said supersets further comprises attempting, for said each decision tree, to identify a superset of sequential nodes by grouping said each given node with one of its child nodes that has a largest access count if said access counts differ by more than said given bound, in view of jointly executing the sequential nodes.

10. The method according to claim 1, wherein:
said respective cache line of the cache memory comprises all attributes of the nodes of said each superset, as necessary for jointly executing such nodes.

11. The method according to claim 1, wherein:
all the attributes of the nodes of said each superset, as necessary for jointly executing such nodes, are encoded to fit into m cache lines of the cache memory, $m \leq 5$, whereby the nodes of said each superset are jointly executed by:
loading attributes of each of the nodes of said each superset in m respective cache lines of the cache memory, unless said cache lines are already loaded in the cache memory; and
processing said attributes from the m respective cache lines loaded.

12. The method according to claim 1, wherein:
two or more decision trees are accessed, the decision trees forming part of an ensemble model.

13. A computer program product for accelerating inferences based on decision trees, the computer program product comprising:
a set of one or more computer-readable storage media;
program instructions, collectively stored in the set of one or more storage media, for causing a processor set to perform the following computer operations:
access one or more decision trees, wherein each decision tree of the decision trees accessed comprises decision tree nodes, these including nodes grouped into one or more supersets of nodes designed for joint execution;
for each decision tree of the decision trees accessed, execute the nodes of said each decision tree to obtain an outcome, whereby one or more outcomes are eventually obtained for the one or more decision trees, respectively; whereby
for each superset of the one or more supersets of said each decision tree, the nodes of said each superset are jointly executed by:
loading attributes of each of the nodes of said each superset in a respective cache line of a cache memory, unless this respective cache line is already loaded in the cache memory; and
processing said attributes from the respective cache line loaded, wherein the nodes of said each superset are jointly executed by vector processing, whereby vector operations are speculatively performed on vector operands mapped onto the attributes of the nodes of said each superset as loaded in the respective cache line; and
return an inference result based on the one or more outcomes obtained.

14. The computer program product according to claim 13, wherein:
said each superset comprises k nodes of said decision tree nodes, whereby the respective cache line loaded in the cache memory comprises one or more sets of cached data, wherein each of the one or more sets of cached data includes at least k elements, onto which said vector operands are mapped.

15. A method of accelerating inferences based on decision trees, the method comprising:
accessing one or more decision trees, wherein each decision tree of the decision trees that is accessed comprises decision tree nodes, these including nodes grouped into one or more supersets of nodes designed for joint execution;
for each decision tree of the decision trees accessed, executing the nodes of said each decision tree to obtain an outcome, whereby one or more outcomes are obtained for the one or more decision trees, respectively, wherein:
for each superset of the one or more supersets of said each decision tree, the nodes of said each superset are jointly executed by:
loading attributes of each of the nodes of said each superset in a respective cache line of a cache memory, unless this respective cache line is already loaded in the cache memory; and
processing said attributes from the respective cache line loaded, wherein the nodes of said each superset are jointly executed by vector processing, whereby vector operations are speculatively performed on vector operands mapped onto the attributes of the nodes of said each superset as loaded in the respective cache line; and
returning an inference result based on the one or more outcomes obtained.

16. The method according to claim 15, wherein:

said each superset comprises k nodes of said decision tree nodes, whereby the respective cache line loaded in the cache memory comprises one or more sets of cached data, wherein each of the one or more sets of cached data includes at least k elements, onto which said vector operands are mapped.

17. The method according to claim 16, wherein:

one of said one or more sets of cached data includes k vector elements corresponding to k threshold values of the k nodes, respectively; and each of the threshold values is a comparand involved in a comparison to be performed as part of executing a respective one of the k nodes.

18. The method according to claim 17, wherein:

said one or more sets include at least two sets of cached data;

a first one of said one or more sets of cached data correspond to said one of said one or more sets of cached data that includes k vector elements corresponding to said k threshold values;

a second one of said one or more sets of cached data includes k vector elements corresponding to k feature identifiers of the k nodes, respectively; and each of the feature identifiers identifies a feature value to be compared with a respective one of the k threshold values as part of executing a respective one of the k nodes.

19. The method according to claim 18, wherein:

said one or more sets include at least three sets of cached data, including:

said first one of said one or more sets of cached data;

said second one of said one or more sets of cached data; and a third one of said one or more sets of cached data, including child node identifiers that point to child nodes of a subset of the k nodes, wherein said child nodes are not in said each superset.

\* \* \* \* \*